Jan. 31, 1956  B. A. ROSEN  2,732,576
DISPOSABLE TOOTH BRUSH
Filed Dec. 27, 1954

INVENTOR.
BERNARD A. ROSEN
BY Howard J. Whelan.
ATTORNEY

United States Patent Office 2,732,576
Patented Jan. 31, 1956

2,732,576

DISPOSABLE TOOTH BRUSH

Bernard A. Rosen, Baltimore, Md.

Application December 27, 1954, Serial No. 477,666

3 Claims. (Cl. 15—137)

This invention relates to dental devices and more particularly to those employed for brushing and cleaning teeth and including a self contained tooth paste or powder that may be dispensed as needed.

In the conventional type of tooth brush having a dentifrice encased in a magazine arranged in the handle to provide the cleansing detergent, the device usually requires screw-threaded parts and other structural details that are productionally expensive, while at the same time rendering the path of the detergent to the bristles of the brush relatively obstructive. This invention is adapted for economical production and short time use, so it may be marketed inexpensively and fitted compactly in a dispensing machine or in the pocket of the user. It comprises three main components that can be stamped or molded readily and fitted together and the detergent supply included, without expensive fasteners or attachment means.

The invention includes in its objects to provide a new and improved tooth brush with self-contained detergent, that will be simple in design, comparatively inexpensive to manufacture and effective in use.

The invention includes in its main objects to provide a new and improved tooth brush with self-contained detergent that will be expelled from the compartment out and against the bristles of the brush as the handle is pulled outwardly to grasp the brush and to be used as a handle.

The invention includes in its main objects to provide a new and improved tooth brush with self contained detergent that can be adapted for dispensing from a coin operated dispensing machine.

The invention includes in its main objects to provide a new and improved tooth brush with self contained and self propelled detergent that will be compact and easily manipulatable.

An additional object of the invention is to provide a new and improved tooth brush unit that will permit a detergent to be readily placed within the tooth brush that can be readily closed over to make the contents available without a tendency to leak out before use.

Other objects of the invention will become evident as it is more fully described.

For a clear understanding of the invention, objects and operation, reference is made to the accompanying drawings which in conjunction with the following outline indicate a particular form embodying it, with the claims emphasizing its scope.

In the drawings.

Similar reference characters refer to similar parts throughout the drawings.

Figure 1:
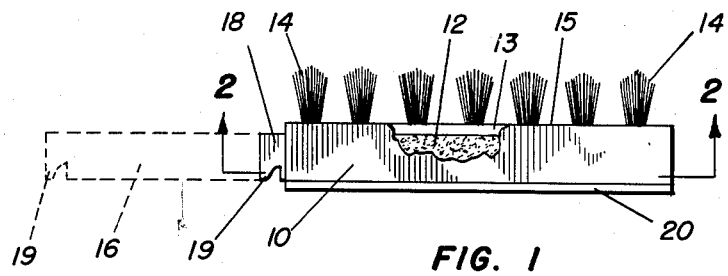
Figure 1 is a side elevation of a tooth brush unit embodying this invention with portions broken away to show its interior construction, with the handle enclosed and its extended position shown in dotted lines.
Figure 2:
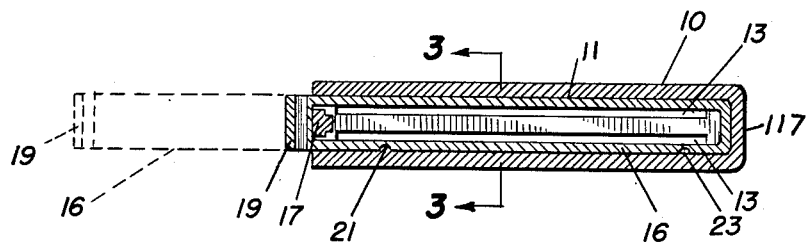
Figure 2 is a sectional view taken on line 2—2 of Figure 1 with its covering piece removed for filling with detergent.
Figures 3, 4:
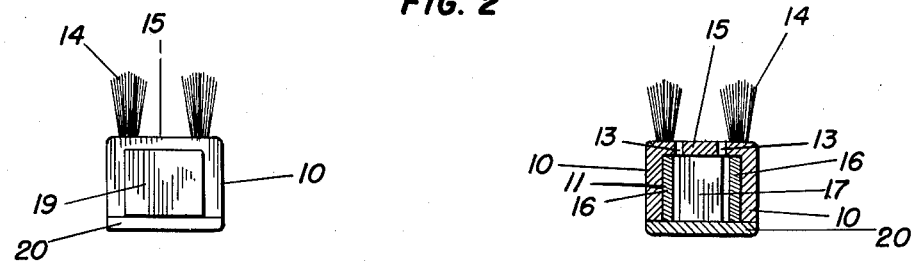
Fig. 3 is a transverse sectional view taken on line 3—3 of Figure 2.
Figure 4 is an end view showing the handle end of Figure 1.
Figure 5:
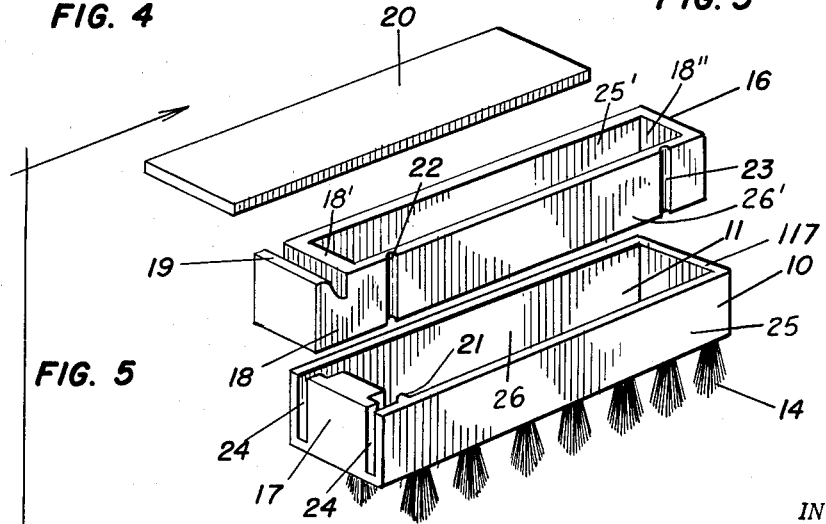
Figure 5 is an exploded view in perspective of the unit showing how the components are assembled together.

In the particular form illustrated, a tooth brush unit consists of an open-like housing 10, forming the lower body portion of the device. This housing comprises opposite parallel side walls 25 and 26, top and bottom walls 20 and 15 and end walls 17 and 117, the first of which has two parallel openings 24 therein. The top wall 20 constitutes a cover for the housing which is secured in place after a shell 16 is placed inside chamber 11 of the housing. As shown, the shell is of hollow frame construction having opposite parallel side walls 25' and 26' extending transversely within the housing and conforming substantially to the internal transverse cross-section of the said housing. The walls 25' and 26' of the shell extend through the openings 24 in the end wall 17 and are joined by end walls 18' and 18". The bottom wall 15 of the housing carries brush bristles 14 and is provided with a pair of slots 13 adjacent the projecting bristles. The shell 16 affords sufficient capacity of the storage of powdered or pasty dentifrice therein. The shell 16 is adapted for travel in the housing in a longitudinal direction towards its end wall 17 and has its head portion 18 formed to provide a handle 19 on the outside of the wall 17, where it can be pulled outwardly. The end wall 17, is slotted at 24 to allow the shell walls to pass freely through it. The dentifrice 12 is poured into the shell until it is filled to the level of the top, while the shell is fully inserted into the housing 10. Then a flat covering plate 20 is cemented, tack welded or otherwise affixed to the top edge of the housing and tightly secured thereon, holding the detergent inside the shell. A knob or tit 21 is formed on the wall of the frame or housing 10 to fit into recesses 22 and 23 symmetrical thereto when the shell and housing are aligned in their normal positions in relation to each other. When the shell is pulled out longitudinally to its predetermined limit, the knob 21 is brought from the recess 22 to fit into the secondary recess 23 by snapping into it. This last placement indicates the final operating position of the shell in the housing with the handle projecting therefrom for manipulating the brush for cleaning the teeth.

When the shell is pulled outwardly, it compresses the detergent and induces it to flow through the slots 13 in the bottom 15 of the housing 10 to contact the sets of bristles 14 so that the latter are coated for dental cleansing. When the last of the detergent 12 is expelled in this manner the unit is ready for use, and after use the unit is discarded or disposed of. The simplicity of the device which may be made from cardboard, plastic or any other cheap material enables the cost of manufacture and sale to be reduced to a very low figure. This permits the units to be dispensed by coin operated vending machines.

In commercial practice it may be desirable to enclose the unit in a plastic or moisture proof envelope or in a carton, so it can be handled readily in a most sanitary way. If the material of which the unit is made is transparent plastic it will permit the contents to be observed from the outside of the unit. However it may be made of any suitable material and stamped out to the proper shapes and contours to suit the requirements involved in making the structure unit. Since no extending handle of the conventional type is required, the length of the unit is kept down and the construction made very compact.

While but one form of the invention is shown in the drawings and described herein, it is not desired to limit this application to the specific structure indicated, as it is appreciated that other forms of construction could be designed and made that would employ the same principles and come within the scope of the appended claims.

Having thus described the invention what is claimed is:

1. A tooth brush unit comprising a housing having parallel side walls, parallel end walls and a bottom wall secured to the said side and end walls, a cover for the open side of said housing, said bottom wall having a pair of parallel slots therethrough, brush bristles carried by and extending outwardly of said bottom wall in the vicinity of said slots, one of the aforesaid end walls having a pair of vertical parallel openings therethrough, a hollow shell comprising opposite side walls and parallel end walls secured to said side walls, said shell being slidably receivable in the housing with its side walls guided in the aforesaid parallel openings, said shell being adapted to receive a dentifrice through the open side of the housing, between its side walls and the bottom wall of the housing, and to dispense the dentifrice through the slots in the said bottom wall upon longitudinal sliding outward movement of the shell within the housing.

2. A tooth brush unit as set forth in claim 1 including releasable locking means between the housing and the shell.

3. A tooth brush unit as set forth in claim 1 including a handle for one of the end walls of the shell whereby the shell may be slid out of the housing.

References Cited in the file of this patent
UNITED STATES PATENTS 1,837,802     Wallace _____ Dec. 22, 1931